United States Patent [19]

Fountain

[11] Patent Number: 4,819,738
[45] Date of Patent: Apr. 11, 1989

[54] VEHICLE FOR SUPPORTING AN IMPLEMENT

[76] Inventor: Glen L. Fountain, 63 Hospital Road, Dalby, Queensland 4405, Australia

[21] Appl. No.: 889,710

[22] Filed: Jul. 28, 1986

[30] Foreign Application Priority Data

Jul. 29, 1985 [AU] Australia .................. PH1686

[51] Int. Cl.$^4$ .................. A01B 51/02; A01B 73/02
[52] U.S. Cl. .................. 172/292; 172/248; 172/435; 180/6.48; 180/327; 180/14.2
[58] Field of Search .............. 172/292, 814, 248, 431, 172/435, 436; 180/89.13, 326, 329, 330, 327, 14.2, 6.48; 280/412, 415; 404/83, 85

[56] References Cited

U.S. PATENT DOCUMENTS

| | | | |
|---|---|---|---|
| 2,449,710 | 9/1948 | Miller | 404/101 |
| 2,551,231 | 5/1951 | Anderson | 180/14.2 X |
| 2,957,254 | 10/1960 | Bederman | 172/292 X |
| 3,261,118 | 7/1966 | Litherland | 172/248 X |
| 3,368,292 | 2/1968 | Prinoth | 37/219 |
| 3,478,833 | 11/1969 | Breon | 180/330 X |
| 3,568,778 | 3/1971 | Swisher | 172/292 |
| 4,204,699 | 5/1980 | Gustafson | 172/248 |

FOREIGN PATENT DOCUMENTS 2554746  6/1977  Fed. Rep. of Germany ...... 172/292

Primary Examiner—Richard J. Johnson
Attorney, Agent, or Firm—Beveridge, DeGrandi & Weilacher

[57] ABSTRACT

An implement supporting vehicle comprises an elongate implement support frame, along one side of which two drive units which propel the vehicle are mounted equidistance from the center of the vehicle. Two castor wheels are mounted along the other side of the frame. The drive units are moveable between a first working direction in which the vehicle can be propelled in a first direction transverse to the longitudinal extent of the frame and a second transport direction in which the vehicle can be propelled in a direction substantially perpendicular to the first direction. A moveable operators cabin is mounted with the frame.

6 Claims, 4 Drawing Sheets

VEHICLE FOR SUPPORTING AN IMPLEMENT

BACKGROUND OF THE INVENTION

1. Field of the Invention

This invention relates to an implement supporting vehicle, for example, an agricultural or ground working implement. Although this invention is described below with particular reference to farming applications it will be apparent that the vehicle described is suitable for many other applications including road work.

2. Description of the Prior Art

A wide variety of agricultural and ground working tasks are performed by implements drawn or carried by the well known farm tractor. This traditional arrangement can suffer from some or all of the following disadvantages:

(a) Difficulty in operator monitoring by the operator of the working of an implement being drawn by the tractor. This is particularly the case with large trailed implements because the operator must control the direction of the tractor by looking forward, while periodically monitoring the implement by looking rearwardly and from side to side. Further, the "length of pull" distance between a trailed implement and the tractor increases as the width of the implement increases. Thus, very large implements of the order of thirty meters in width, can be up to fifteen meters behind the operator's cab.

(b) Large trailed implements are attached to a drawing tractor at one hitch point and are designed to be carried on their own wheels Accordingly, the implement must be a fully structured assembly including a long draw bar and usually built-in folding mechanisms for road transporting of the implement. While such implements are quite heavy, only a small percentage of the weight is transferred to the tractor to assist with traction The tractor must therefore carry added or built in weight for extra traction to pull the weight of the attached implement together with the induced load resulting from the implement doing work against the ground. Considerable energy is thus wasted in the transport of the added tractor weight and structural weight of the implement.

(c) The combined weight of the tractor and the implement also undesirably compacts the soil by the combined effect of the tractor and the implement wheels.

(d) The combined tractor and implement assembly is quite long and since the length increases with the size of the implements, large combinations become very difficult to maneuver. This presents particular difficulties in "strip farming" (long narrow fields).

(e) In the case of three point linkage implements, the width of the implement is limited by the weight of the implement compared with the weight of the tractor or the carrying capacity of the three point linkage on the tractor.

(f) Traditional farm tractors and implements are usually designed separately to meet differing specifications. Thus it is possible to mismatch implements and tractors which leads to inefficiency and sometimes structural and mechanical damage to both machines.

SUMMARY OF THE INVENTION

It is an object of this invention to provide an implement supporting vehicle which will overcome, or at east ameliorate, some of the above disadvantages.

Accordingly this invention consists in an implement supporting vehicle comprising an implement support frame, at least one drive unit mounted with said frame to propel said vehicle, said drive unit being moveable between a first position in which said vehicle can be propelled in a first direction and a second position in which said vehicle can be propelled in a second direction substantially perpendicular to said first direction.

Preferably, each traction unit includes a drive wheel for rotation about a drive axis and the center of gravity of the unit is located outwardly of said axis away from the frame to impose a supporting force on said frame.

BRIEF DESCRIPTION OF THE DRAWINGS

One embodiment of this invention will now be described, by way of example only, with reference to the accompanying drawings in which.

DESCRIPTION OF THE PREFERRED EMBODIMENT

Figure 1:
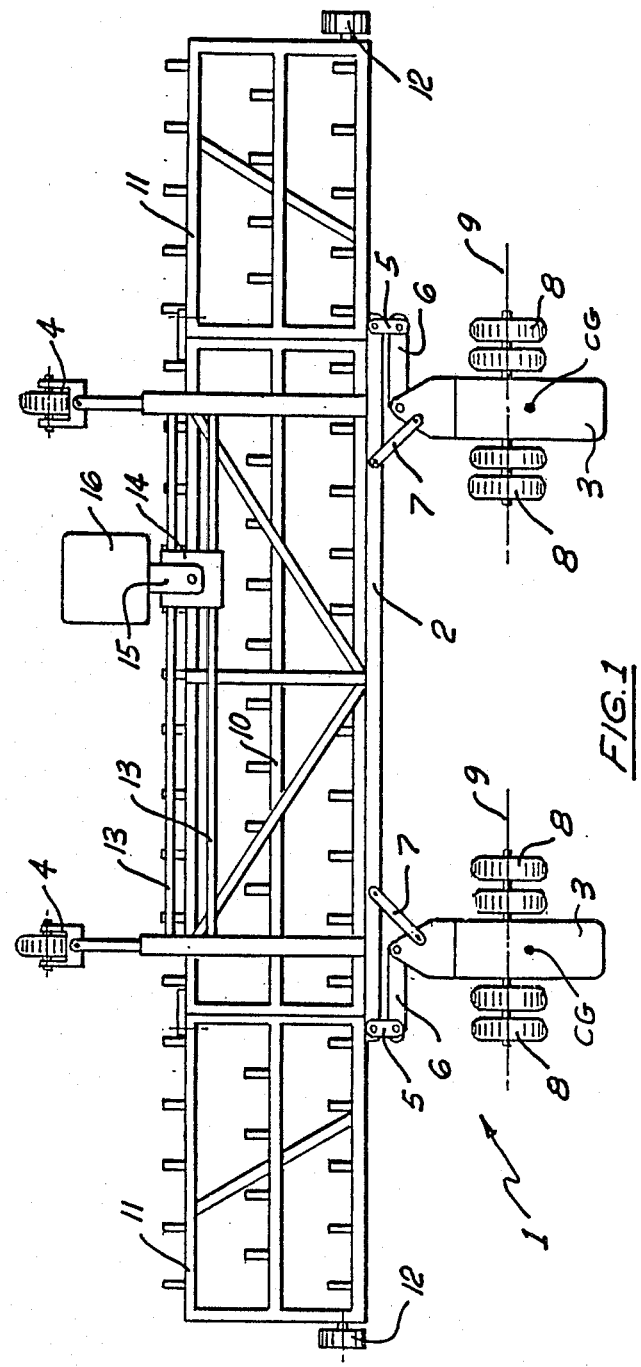
FIG. 1 is a schematic plan view of a vehicle according to this invention.
Figure 2:
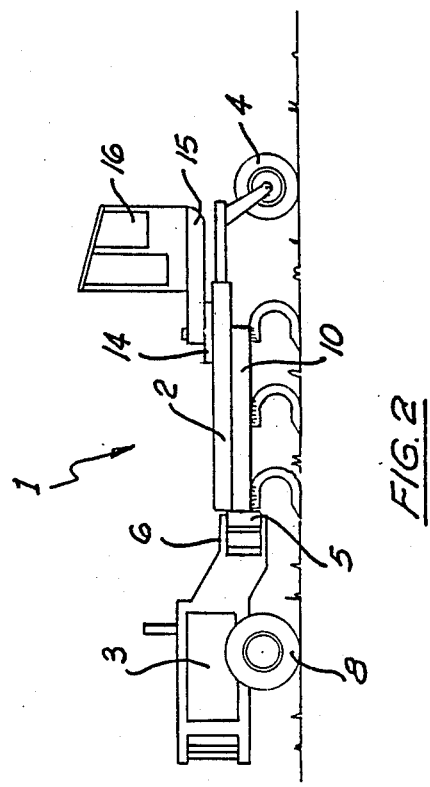
FIG. 2 is a schematic side elevation of the vehicle shown in FIG. 1.

Referring to FIGS. 1 and 2 the vehicle 1 comprises a support frame 2 to which two drive units 3 are mounted an equal distance from the central axis of the vehicle 1. The drive units 3 are shown in a first or working position. The rear of the frame 2 is supported by two castor wheels 4 which are interconnected mechanically or hydraulically to allow the castor wheels 4 to rise and fall dependently. This allows the castor wheels 4 to follow the contour of uneven terrain thereby adding to the stability of the machine.

Drive units 3 are mounted to the frame by hinged arms 5 and 6. A disengagable locking strut 7 is connected between each drive unit 3 and the frame 2. In this first or working position the drive units propel the vehicle in a first direction.

Figure 3:
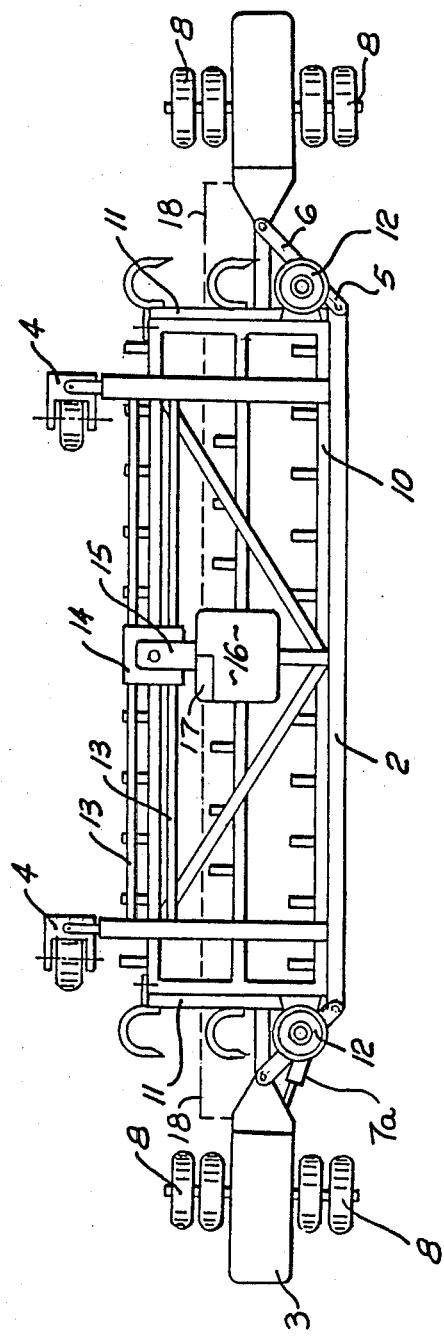
FIG. 3 is a schematic plan view similar to FIG. 1 showing the vehicle in a transport configuration.

Disengagement of locking struts 7 allows the drive units 3 to be moved from the first (working) position shown in FIGS. 1 and 2 to the transport position shown in FIG. 3. In the transport position the drive units 3 propel the vehicle in a second direction substantially perpendicular to the first direction. Castor wheels 4 are able to change direction in the conventional manner so as so conform with the direction of drive of the traction units 3.

Each traction unit has two sets of drive wheels 8 mounted for rotation about a drive axis 9. Each traction unit 3 includes a substantially conventional engine and transmission which are mounted so that the center of gravity CG of the traction unit 3 is located outwardly of the axis 9 and away from the frame 2 to impose an upwardly directed supporting force on the frame 2. In this way a large percentage of the total weight of the vehicle and its drive means is placed on the drive wheels 8.

An implement 10 is mounted below frame 2 for height adjustment by means of hydraulic rams (not shown) in a known manner. Wings 11 of the implement extend beyond the frame 2 at each side and have supporting wheels 12 at the outer extremities. Before drive units 3 are moved to the transport position the wings 11 are folded upwardly by hydraulic rams (not shown) to a transporting position shown in FIG. 3 in the known manner.

Frame 2 includes two spaced parallel rails 13 extending across the rear thereof. A carriage 14 is mounted on rails 13 for movement across the frame 2. The carriage mounts an arm 15 for limited rotation and the free end of arm 15 mounts an operators cabin 16. The cabin is also mounted for limited rotation with respect to arm 15.

Small electric motors (not shown) allow selective rotation of arm 15 with respect to the carriage and rotation of the cabin. In this way the cabin can be moved between a first orientation, shown in FIG. 1, for operating the vehicle when propelled in the first working direction and a second orientation, shown in FIG. 3, for operating the vehicle when propelled in the second or transport direction.

The carriage 14 and rails 13 allow translational movement of the cabin across the vehicle under the control of a further electric drive (not shown). This facilitates improved monitoring of the implement by the operator.

Although a moveable operating cabin 16 is preferred a fixed cabin still allows efficient operation of the vehicle. In another embodiment the vehicle can be controlled remotely by any suitable known means.

In operation, the vehicle is controlled by the operator from the cabin. In the first (working) position, the drive unit wheels are set perpendicular to the longest axis of the frame 2 and propel the vehicle such that the frame 2 moves across the ground transverse to the longest axis. The vehicle is steered by a system which has operator controlled means 17 which, by control lines 18, provides independent variation of the drive speed of the drive units 3. The drive units 3 are placed proportionally along frame 2 so that only small variations in the drive speeds of each drive unit give significant changes of direction.

FIG. 3 shows the vehicle in a transport configuration in which it can be driven on a roadway or through narrow gates and the like. To change the vehicle from the working configuration shown in FIGS. 1 and 2 to the configuration of FIG. 3 the following procedure is adopted. Firstly, wings 11 of implement 10 are folded to the transporting position. Locking struts 7 are disconnected from frame 2. Drive units 3 are pivoted about the connection with the frame formed by arms 5 and 6 to the second or transport position shown in FIG. 3. The drive units are moved between the two positions under their own power or by means of hydraulic rams (not shown) or a combination of both. When the drive units are in position locking struts 7 are engaged with a mounting on the rear of the frame. Finally, the operator's cabin is moved to the transport orientation as described above.

In the transport configuration the vehicle is normally propelled by only one of the drive units and is steered by a hydraulic ram 7a in place of one or both locking struts 7 which act to change the direction of the or each drive unit.

Figure 4:
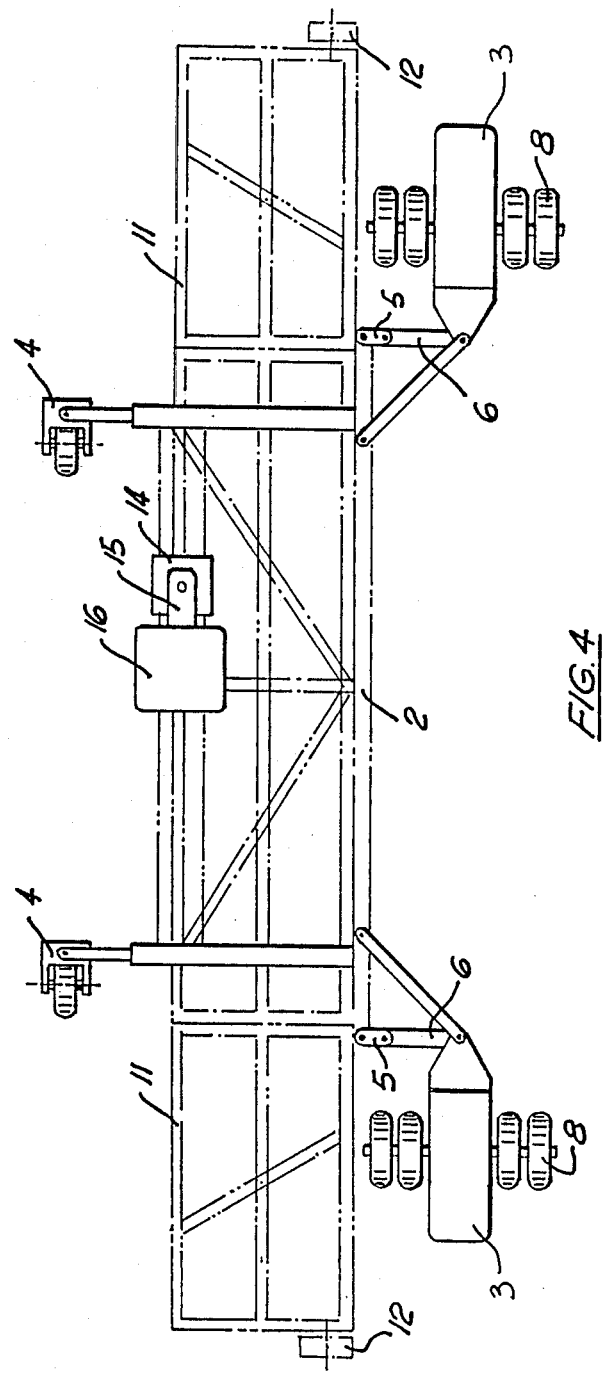
FIG. 4 is a schematic plan view similar to FIG. 1 showing the vehicle in an implement changing configuration.

FIG. 4 shows the vehicle in an implement changing configuration. The vehicle is changed to this configuration from the first or working configuration by a procedure similar to that described above for changing to the transport configuration. The wings 11 of the implement are not however folded to a transporting position. In addition the drive units are only moved as far as the position shown in FIG. 4 and the locking struts are engaged with a further mounting on the frame.

In this configuration the implement can be released and the vehicle driven off the implement and onto another implement. The vehicle is then changed to the transport or working configuration as required.

The vehicle is particularly adapted for cultivation of land in "strip farming" situations or narrow fields formed between contour banks. In this application the following procedure is adopted. The vehicle is set with the drive units in the first or working position. A first pass is made in the normal manner. To reverse the direction of the vehicle for a second pass the vehicle is driven to the end of the field in the first pass, the implement is lifted clear of the ground and the machine is reversed and turned into position for a second pass. The ground working implement is then reset and the second pass made. When the strip has been completed the narrow "head land" can easily be worked in a perpendicular direction. It will be noted that the unworked head land will only be the depth of the vehicle wide.

When working large fields, the vehicle is driven around the perimeter of the field progressively working towards the center in a conventional manner.

It will be apparent that the above described vehicle offers considerable advantages over a traditional farm tractor and trailing implement system. In particular, because of the unique loading placement, the overall weight of the vehicle and tillage equipment is considerably less than that required for a similar effective traction by conventional units. The reduction in weight gives a considerable direct energy saving and reduces soil compaction. In particular, it has been found that the drive wheels of the traction modules can easily support 70% of the weight of the tillage equipment plus 70% of the induced weight caused by down draft of ground engaging tools. The drive wheels also carry the full weight of their individual engine, transmission and fuel load. It will be apparent that the drive units can comprise part of a suitably modified conventional tractor.

In a preferred form the vehicle is modified so as to be particularly suitable for use in row cropping applications. Cultivation of crops grown in rows is normally carried out using three point linkage implements on conventional tractors which limits the implement width to approximately 8 meters due to implement weight and the area needed to turn the tractor and implement combination around.

In accordance with the modifications the drive units are provided with transmissions which can propel the vehicle at the same forward and reverse ground speeds, at least in the first working position. In addition, a series of pivotally mounted subframes are provided under the frame each of which can be operated by hydraulic control to reverse the direction of ground working tools mounted thereon. As with the embodiment described above the operators cabin is also mounted pivotally and in accordance with the modification can orient the operator for operation of the vehicle in a forward or reverse direction when the vehicle is in the first or working configuration.

In the modified form the vehicle can be operated as follows. A pass in which a number of rows are cultivated is made in one direction. The vehicle is changed to a configuration similar to the implement changing configuration of FIG. 4 and is driven "sideways" into alignment with the next group of rows to be worked. At the same time the operators cabin and ground working implements are reversed as described above. The vehicle is changed to the working configuration and is then worked in the reverse direction. The process is repeated at the other end of the field for a further group of rows.

It will be apparent that the modified form of the vehicle thus allows row crops to be cultivated with a greater implement coverage per pass than hitherto possible.

In further variations of the above described vehicle each drive unit can be driven by an engine mounted on the supporting frame or all drive units can be driven by a single centrally located engine. The transmission used in the traction units can be mechanical, hydraulic or electrical. In addition, the rear castor wheels can be arranged to be steered by the operator.

In another embodiment the rear castor wheels can be driven mechanically or hydraulically either from the engine or engines supplying power to the drive units or a secondary engine.

I claim:

1. An implement supporting vehicle which is convertible between a working configuration and a transport configuration comprising an elongate implement support frame which has two ends, two sides, a central longitudinal axis, and a central transverse axis; said vehicle being selectively movable in a first working direction which is parallel to said central transverse axis, and a second transport direction which is parallel to said central longitudinal axis; two independent drive units mounted on one side of said frame substantially equally spaced from and on opposite sides of said central transverse axis of the vehicle, at least one support wheel mounted on said frame on the side remote from said drive units, each said drive unit including a pivot arm having one end pivotally attached to said frame and a second end pivotally attached to said drive unit whereby each drive unit may be selectively oriented in a first working position in which said vehicle can be propelled in said first direction and reoriented in a second transport position in which said vehicle can be propelled in said second direction, said drive units lying on said central longitudinal axis at opposite ends of the frame when the vehicle is in its transport configuration, each drive unit including an engine and a drive wheel for rotation about a drive axis, and the center of gravity of each drive unit being located outwardly of said drive axis away from the frame to impose an upwardly directed supporting force on the frame.

2. A vehicle as claimed in claim 1 wherein the vehicle has steering control means for adjusting the relative drive speed of the two drive units.

3. A vehicle as claimed in claim 1 wherein said support wheel is a castor wheel.

4. A vehicle as claimed in claim 1 wherein said vehicle includes an operators cabin mounted with said frame for movement between a first orientation for operating the vehicle when propelled in said first direction and a second orientation for operating the vehicle when propelled in said second direction.

5. A vehicle as claimed in claim 4 wherein said cabin is mounted for translational movement with respect to said frame to facilitate operator monitoring of said implement.

6. A vehicle as claimed in claim 1 wherein said drive units are adapted to propel the vehicle at the same forward and reverse speeds when located in said first position.

* * * * *